(12) United States Patent  (10) Patent No.: US 7,651,303 B2
Zick et al.  (45) Date of Patent: Jan. 26, 2010

(54) CONDUIT REAMER TOOL ELEMENT

(75) Inventors: Jonathan A. Zick, Waukesha, WI (US);
Michael W. Kirby, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 12/043,524

(22) Filed: Mar. 6, 2008

(65) Prior Publication Data

US 2008/0219790 A1 Sep. 11, 2008

Related U.S. Application Data

(60) Provisional application No. 60/893,302, filed on Mar. 6, 2007.

(51) Int. Cl.
*B23B 41/00* (2006.01)
(52) U.S. Cl. ................... 408/80; 408/211; 408/223; 408/240; 7/158; 7/165
(58) Field of Classification Search .......... 408/211, 408/223–224, 226, 238, 239 R, 240, 80, 82, 408/233, 713; 279/75; 7/157, 158, 165, 7/901
See application file for complete search history.

(56) References Cited

U.S. PATENT DOCUMENTS

| | | | | |
|---|---|---|---|---|
| 499,098 | A | * 6/1893 | Comstock | 408/224 |
| 2,470,392 | A | * 5/1949 | Gassmann | 408/201 |
| 3,595,107 | A | * 7/1971 | Dackow | 82/113 |
| 3,645,640 | A | * 2/1972 | Zukas | 408/192 |
| 4,076,446 | A | 2/1978 | Lindstaedt | |
| 4,274,770 | A | * 6/1981 | Singer | 408/211 |
| 4,586,408 | A | * 5/1986 | Goldner | 82/114 |
| 4,662,803 | A | 5/1987 | Arnold | |
| 4,678,380 | A | 7/1987 | Zahuranec et al. | |

(Continued)

FOREIGN PATENT DOCUMENTS

JP 02269505 A * 11/1990

OTHER PUBLICATIONS

Klein Tools 85191 Conduit-Fitting & Reaming Screwdriver available at [http://www.ktool.net/servlet/the-572/KLEIN-TOOLS-85191-Conduit-dsh-Fitting/Detail] at least as early as Apr. 17, 2007.

(Continued)

*Primary Examiner*—Daniel W Howell
(74) *Attorney, Agent, or Firm*—Michael Best & Friedrich LLP

(57) ABSTRACT

A conduit reamer for a cutting tool includes a generally cylindrical body having a longitudinal axis and a blade coupled to the generally cylindrical body. The blade includes a first blade portion defining a first height of the conduit reamer with respect to the longitudinal axis and a second blade portion defining a second height of the conduit reamer with respect to the longitudinal axis, wherein the first height is different than the second height. The conduit reamer further includes a shank end having a shank configured to be received and driven by the cutting tool, a bit end opposite the shank end and having a cavity configured to receive a tool bit, and a locking mechanism positioned proximate the bit end and configured to secure the tool bit within the cavity.

20 Claims, 5 Drawing Sheets

U.S. PATENT DOCUMENTS

| | | | |
|---|---|---|---|
| 4,688,971 A | | 8/1987 | Carmona |
| 4,691,600 A | | 9/1987 | Carlson et al. |
| 4,692,073 A | * | 9/1987 | Martindell ............. 408/239 A |
| 4,740,121 A | | 4/1988 | Arnold |
| 4,889,454 A | | 12/1989 | Hillestad et al. |
| 4,900,202 A | * | 2/1990 | Wienhold ................ 408/240 |
| 4,915,552 A | | 4/1990 | Hillestad et al. |
| 4,930,946 A | | 6/1990 | Phillips, Sr. |
| 4,958,542 A | | 9/1990 | Skerrett |
| 5,010,967 A | | 4/1991 | Desai |
| 5,012,863 A | | 5/1991 | Springer |
| 5,180,260 A | | 1/1993 | Phillips, Sr. |
| D333,964 S | * | 3/1993 | Alexander ................ D8/82 |
| 5,363,530 A | | 11/1994 | Dunn et al. |
| 5,401,126 A | | 3/1995 | Norris et al. |
| 5,427,477 A | | 6/1995 | Weiss |
| 5,915,893 A | | 6/1999 | Miyanaga |
| 5,938,379 A | | 8/1999 | Tseng |
| 6,101,696 A | | 8/2000 | Carter |
| 6,487,947 B1 | | 12/2002 | Clai |
| 6,497,022 B1 | | 12/2002 | Carter |
| 6,524,035 B1 | | 2/2003 | Robison |
| 6,843,621 B2 | | 1/2005 | Burnette |

OTHER PUBLICATIONS

Ideal Industries' Twist-A-Nut Conduit Deburring Tool available at [http://www.idealindustries.com/ht/HandTools.nsf] at least as early as Apr. 10, 2007.

Klein Pal Thin Wall Conduit Reamer available [http;//www.mytoolstorecom/klein/19352.html] least as early as Apr. 17, 2007.

* cited by examiner

CONDUIT REAMER TOOL ELEMENT

CROSS REFERENCE TO RELATED APPLICATIONS

The present patent application claims priority to U.S. Provisional Patent Application Ser. No. 60/893,302, titled "CONDUIT REAMER TOOL ELEMENT," filed on Mar. 6, 2007, the entire contents of which is hereby incorporated by reference.

BACKGROUND

The present invention relates to an accessory bit for a power tool, and, more particularly, to a conduit reamer tool element or bit for a power tool.

SUMMARY

In one embodiment, the invention provides a conduit reamer for a cutting tool. The conduit reamer includes a generally cylindrical body having a longitudinal axis and a blade coupled to the generally cylindrical body. The blade includes a first blade portion defining a first height of the conduit reamer with respect to the longitudinal axis and a second blade portion defining a second height of the conduit reamer with respect to the longitudinal axis, wherein the first height is different than the second height. The conduit reamer further includes a shank end having a shank configured to be received and driven by the cutting tool, a bit end opposite the shank end and having a cavity configured to receive a tool bit, and a locking mechanism positioned proximate the bit end and configured to secure the tool bit within the cavity.

In another embodiment, the invention provides a conduit reamer for a cutting tool. The conduit reamer includes a generally cylindrical body that includes a first cylindrical portion having a first diameter and a second cylindrical portion having a second diameter. The second diameter is different than the first diameter. The conduit reamer further includes a blade having a first blade portion and a second blade portion. The first blade portion is positioned adjacent the first cylindrical portion and the second blade portion is positioned adjacent the second cylindrical portion. The conduit reamer further includes a shank end having a shank configured to be received and driven by the cutting tool, a bit end opposite the shank end and having a cavity configured to receive a tool bit, and a locking mechanism positioned proximate the bit end and configured to secure the tool bit within the cavity.

In another embodiment, the invention provides a conduit reamer for a power tool. The conduit reamer includes a generally cylindrical body that includes a first end portion, a second end portion, a first cylindrical portion having a first diameter, and a second cylindrical portion having a second diameter. The second diameter is different than the first diameter. The conduit reamer further includes a shank end having a shank and configured to couple the conduit reamer to the power tool and a bit end opposite the shank end and configured to receive a tool bit.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
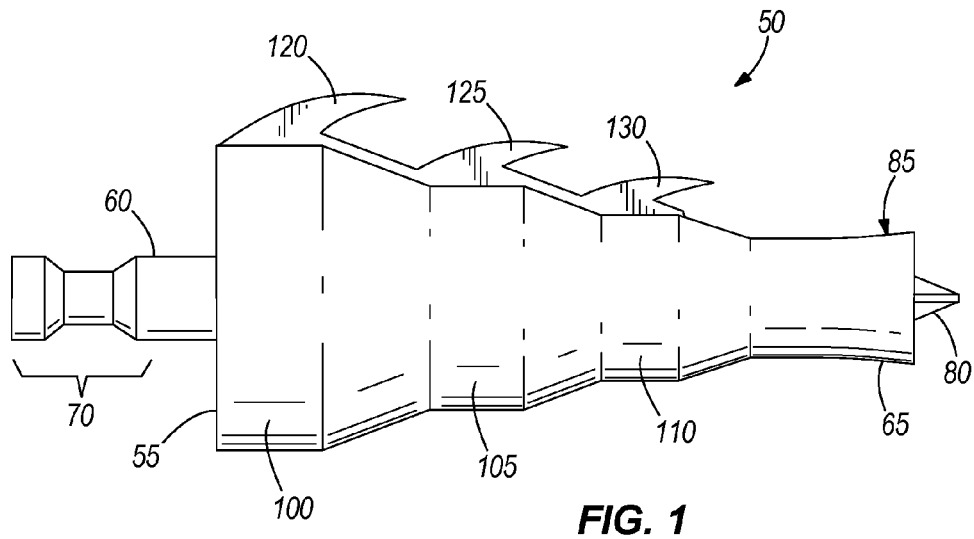
FIG. 1 is a conduit reamer bit for a power tool according to an embodiment of the present invention.
Figure 2:
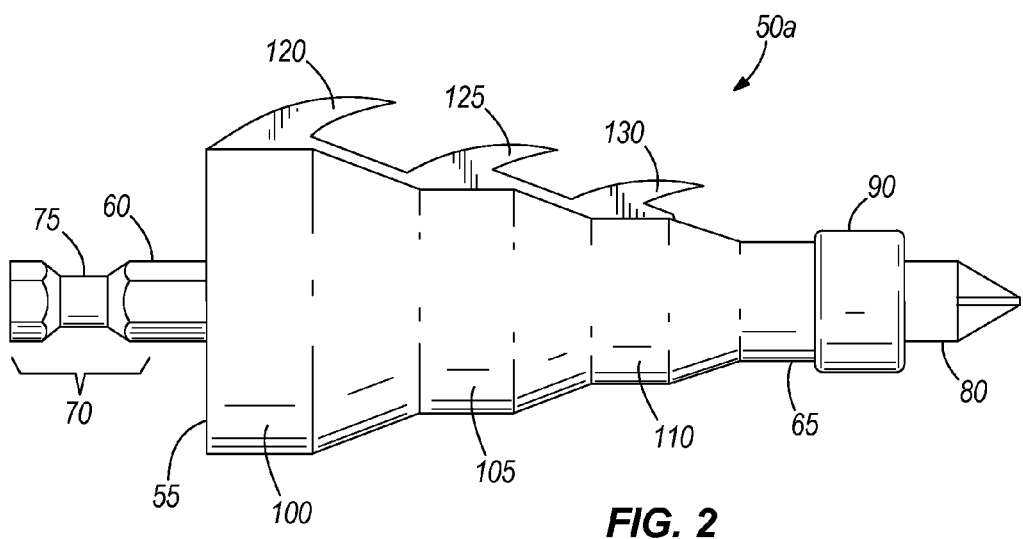
FIG. 2 is a conduit reamer bit for a power tool according to another embodiment of the present invention.
Figure 3:
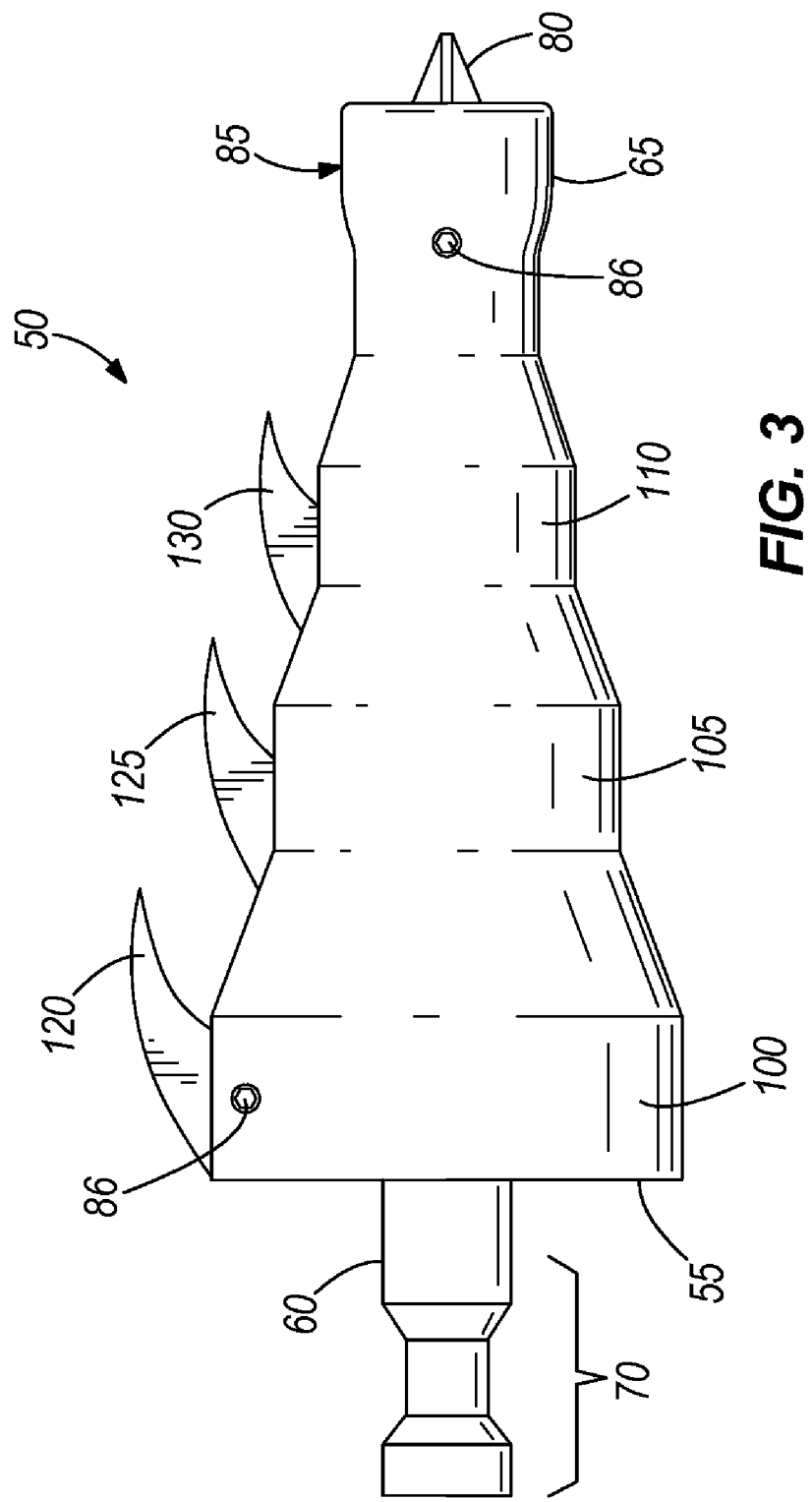
FIG. 3 is a conduit reamer bit for a power tool according to yet another embodiment of the present invention.

An accessory bit, such as a conduit reamer tool element or bit 50, is shown in FIGS. 1-3. The conduit reamer bit 50 is configured to engage with the chuck of a power tool, such as, for example, a drill, a driver drill, a screwdriver (all not shown) and the like.

In the constructions shown, the conduit reamer bit 50 includes a generally cylindrical body 55, a first end portion 60 and a second end portion 65. The first end portion 60 includes a shank 70. The shank 70 allows the conduit reamer bit 50 to connect to a power tool. The shank 70 may have one of several different configurations, such as, for example, a generally circular cross-sectional shape, a hexagonal cross-sectional shape, a D-shaped cross-sectional shape, a hexagonal cross-sectional shape with a groove 75 (as shown in FIGS. 1-3), a three flat sided cross-sectional shape, and the like.

In some constructions, the second end portion 60 includes a longitudinal bore or cavity 79 for receiving and/or retaining a second tool element or bit 80 to be driven by a power tool (not shown), such as a drill, when the conduit reamer 50 is connected to the tool. In some constructions, the bit 80 can be a flat head screw bit, a Phillips head screw bit, a slotted screw bit, a torque-style screw bit, a Robertson screw bit or another bit for engaging with a workpiece. For example, bit 80 may be a Phillips screw bit used for driving screws into a workpiece. The conduit reamer 50 and tool bit 80 combination provides a multi-function tool accessory for an operator that can perform a plurality of tasks, including, but not limited to, reaming a conduit or pipe by smoothing burrs on both the interior and exterior surfaces of the conduit and engaging the tool bit with a workpiece to perform drilling functions.

As shown in FIGS. 1-3, the generally cylindrical body 55 of the conduit reamer bit 50 includes three stepped cylindrical portions 100, 105 and 110. A hook-shaped member or blade 120, 125 and 130 is coupled to the cylindrical portions 100, 105 and 110, respectively. In some constructions, such as the constructions shown in FIGS. 1-2, the hook-shaped members 120, 125 and 130 are formed from an integral piece of material, such as steel or another metallic material. In other constructions, the hook-shaped members 120, 125 and 130 are integral with the cylindrical portions 100, 105 and 110, respectively. In other constructions, such as the construction shown in FIG. 3, the hook-shaped members 120, 125 and 130 are separate members and are individually coupled to the body 55. The hook-shaped members may be selectively removable, either individually or collectively, with a hex key, such as an Allen wrench or other type of tool, operable at hex screw 86.

Figure 6:
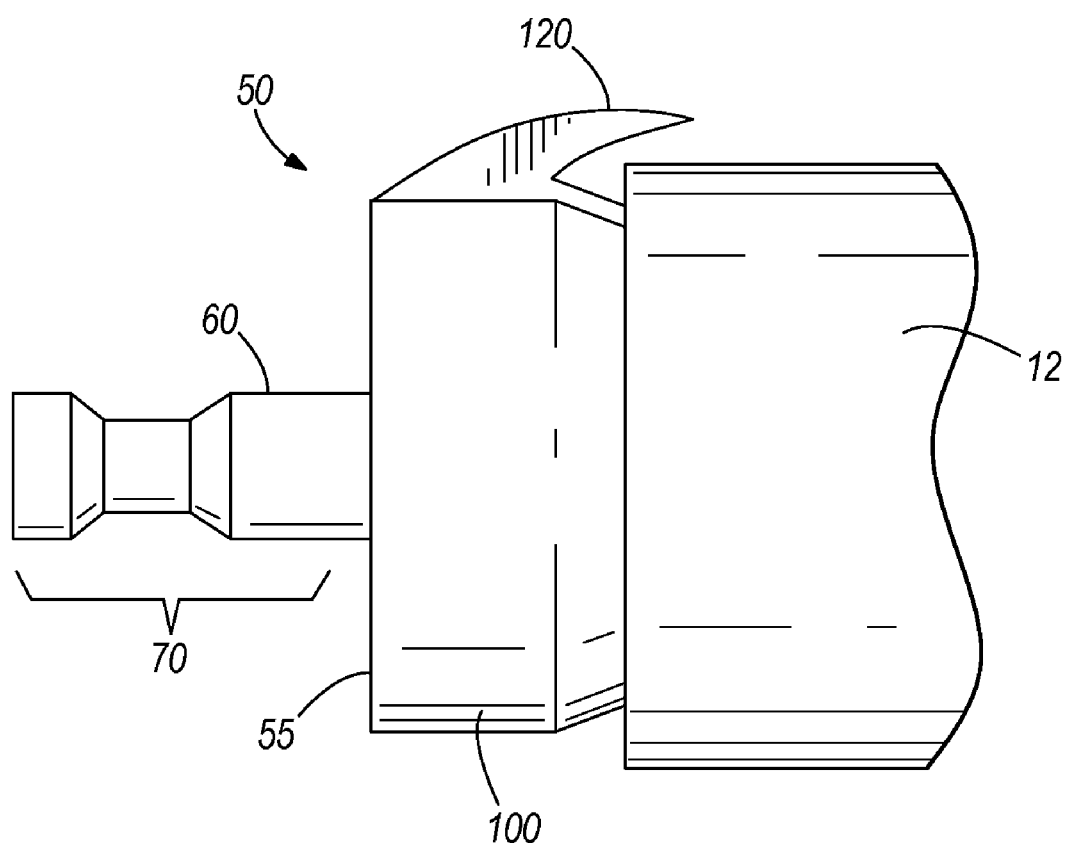
FIG. 6 is a side view of a portion of the conduit reamer bit of FIG. 1 showing the conduit reamer bit in operation and reaming a pipe.

In the illustrated embodiments, the first cylindrical portion 100 and associated blade 120 are configured for reaming and smoothing a pipe 12 having a 1-inch diameter (see FIG. 6). FIG. 6 shows the conduit reamer bit 50 positioned to ream a pipe 12, such that blade 120 on first cylindrical portion 100 contacts the exterior portion of pipe 12 during reaming and smoothing operation. The second cylindrical portion 105 and associated blade 125 are configured for reaming and smoothing a pipe having a ¾-inch diameter. The third cylindrical portion 110 and associated blade 130 are configured for reaming and smoothing a pipe having a ½-inch diameter. In other constructions, the cylindrical portions and associated blades may be configured to ream and smooth pipe having other diameter dimensions than shown and described. In further constructions, the conduit reamer bit 50 includes fewer or more cylindrical portions and associated blades than shown and described.

Figure 1A:
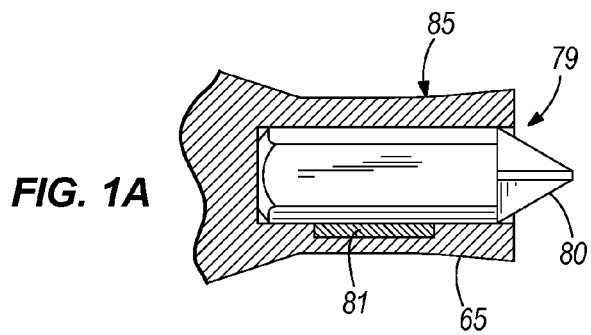
FIG. 1A is a cross-sectional view of a portion of the conduit reamer bit of FIG. 1 illustrating a bore for receiving a tool bit.

As shown in FIG. 1A, in one embodiment of the invention, the cavity 79 may include a magnet 81 positioned within the cavity 79. The magnet 81 helps retain bit 80 within the cavity 79. In other constructions, the cavity 79 may include a plurality of magnets to retain bit 80 within the cavity.

In some constructions, such as the construction shown in FIG. 1, the second end portion 65 includes a sleeve 85 wrapped substantially around a portion of the bit 80. The sleeve 85 helps retain the bit 80 within the cavity 79. In some constructions, such as the construction shown in FIG. 3, the bit 80 is removable by operation of a hex key, such as an Allen wrench or other type of tool, operable at hex screw 86.

In other constructions, such as the construction shown in FIG. 2, the second end portion 65 includes a locking mechanism 90 for securing the second bit 80 within the cavity. For example, the locking mechanism 90 may be the locking mechanism shown and described in U.S. patent application Ser. No. 11/681,546, filed Mar. 2, 2007, or U.S. application Ser. No. 11/681,553, filed Mar. 2, 2007, the entire contents of all of which are hereby incorporated by reference. In some embodiments, the locking mechanism can be substantially similar to the quick-change chuck assembly described in U.S. Pat. Nos. 6,457,916 and 5,417,527, the tool bit holder described in U.S. Pat. No. 6,561,523, the chuck assembly described in U.S. Pat. Nos. 5,013,194 and 4,900,202, and/or the multiple mode chuck described in U.S. Pat. No. 6,966,562, the entire contents of each of which is hereby incorporated by reference.

Figure 4:
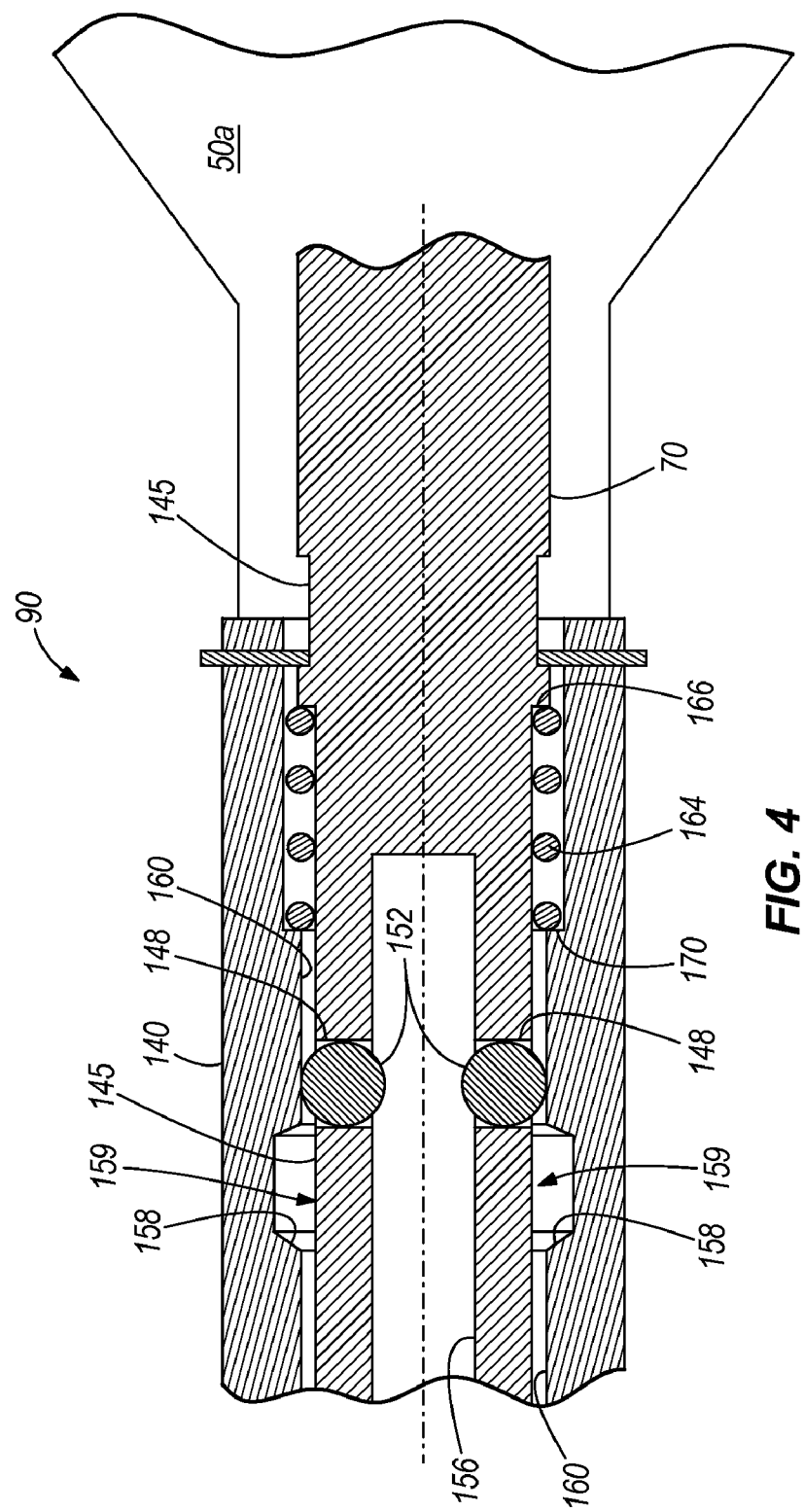
FIG. 4 is a cross-sectional view of a portion of a locking mechanism of the present invention.

FIG. 4 illustrates one embodiment of a locking mechanism 90 for the conduit reamer 50a in a locked position. In FIG. 4, the locking mechanism 90 includes an actuator 140 supported on an exterior surface 145 of the shank 70. The actuator 140 is configured to move the locking member 152 between a locked position and an unlocked position. Channels 148 extend radially through the shank 70, and locking members 152 are supported in the channels 148 for movement between the locked position (shown in FIG. 4), in which the locking members 152 extend radially inwardly into the recess cavity bore 156 to secure the bit (not shown) within the bore 156, and the unlocked position, in which the locking members 152 are movable along the channels 148 and out of the bore 156. Locking members 152 are shown as balls, although in other embodiments, the locking members may be another known locking member, such as a roller or the like.

As shown in FIG. 4, the locking mechanism 90 includes the actuator 140 supported on the exterior surface 145 of the shank 70 for axial movement along the shank 70 between the locked position, which is a forward-most position (shown in FIG. 4) and an unlocked position, which is a rearward-most position (not shown). The actuator 140 also includes a recess 159 extending circumferentially around an interior surface 160 of the actuator 140. The recess 159 includes ramps 158 configured to prevent any jamming of the locking members 152 within the recess 159 during operation of the locking mechanism 90. In still other embodiments, the actuator 140 may include a recess 159 extending in a serpentine path or threaded around the shank 70.

In this manner, when the actuator 140 is moved toward the locked position, the interior surface 160 of the actuator 140 moves into camming engagement with each of the locking members 152 to move the locking members 152 radially inwardly along the channels 148 toward the bore 156 (as shown in FIG. 4). When the actuator 140 is moved toward the unlocked position, the recess 159 is moved into radial alignment with the channels 148 so that the locking members 152 move radially outwardly along the channels 148 and away from the bore 156 to allow removal of the tool bit from the bore.

The locking mechanism 90 also includes a biasing member 164 for biasing the actuator 140 toward the locked position. As shown in FIG. 4, the biasing member 164 can be supported on the exterior surface 145 of the shank 70 between an outwardly-extending shoulder 166 of the shank 70 and an interior shoulder 170 of the actuator 140.

Figure 5:
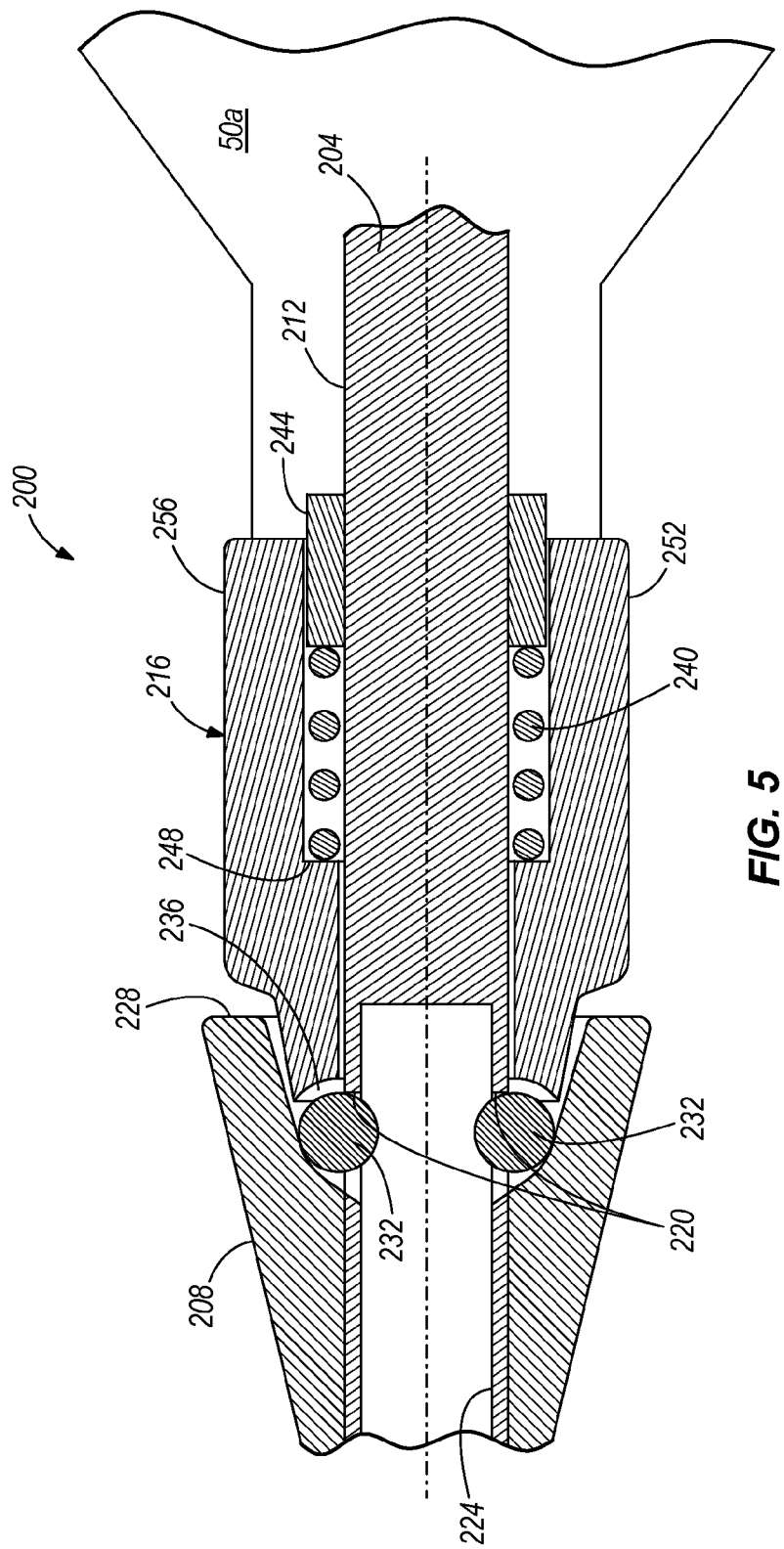
FIG. 5 is a cross-sectional view of another embodiment of a locking mechanism the present invention.

FIG. 5 illustrates another embodiment of a locking mechanism 200 on a conduit reamer 50a including a shank 204. In the illustrated embodiment of FIG. 5, the locking mechanism 200 includes a sleeve 208 supported on an exterior surface 212 of the shank 204 and an actuator 216. Channels 220 extend radially through the shank 204 and a portion of the sleeve 208. As shown in FIG. 5, a first end of each channel 220 opens into a bore 224 in the shank 204 and a second end of each channel 220 opens axially toward a rear end 228 of the sleeve 208.

FIG. 5 shows the locked position, in which locking members 232 are supported in the channels 220 for movement wherein the locking members 232 extend radially inwardly from the second end of the channel 220 and into the bore 224 to secure the tool bit in the bore 224. In an unlocked position, the locking members 232 are movable along the channels 220 and out of the bore 224.

In the illustrated embodiment, the locking mechanism 200 includes two locking members 232 supported for movement along two channels 220. In other embodiments, the locking mechanism can include one, three, or more locking members supported for movement along one, three, or more channels.

As shown in FIG. 5, the locking mechanism 200 includes actuator 216 supported on the exterior surface 212 of the shank 204 for axial movement along the shank 204 between the locked or forward-most position (shown in FIG. 5) and the unlocked or rearward-most position. In the illustrated embodiment of FIG. 5, the actuator 216 also includes a forwardly-extending protrusion 236.

In this manner, when the actuator 216 is moved toward the locked position, the protrusion 236 is moved into camming engagement with each of the locking members 232 to move the locking members 232 forwardly and radially inwardly along the channels 220 toward the locked positions in the bore 224. When the actuator 216 is moved toward the unlocked position, the locking members 232 move radially outwardly along the channels 220 and away from the bore 224 to allow removal of the tool bit.

In the illustrated embodiment of FIG. 5, the locking mechanism 200 also includes a biasing member 240 for biasing the actuator 216 toward the locked position. As shown in FIG. 5, the biasing member 240 is supported on the exterior surface 212 of the shank 204 between a collar 244 and an interior shoulder 248 of the actuator 216.

As also shown in FIG. 5, a rearward portion 252 of the actuator 216 extends rearwardly across the biasing member 240 to substantially enclose the biasing member 240 and to prevent debris from entering the locking mechanism 200.

In some embodiments, the outer surface 256 of the actuator 216 is knurled and/or includes outwardly extending protrusions to provide a slip-resistant gripping surface. In these and other embodiments, the outer surface 256 of the actuator 216 or a portion of the outer surface 256 of the actuator 216 includes or may be formed from an elastic material to provide a cushion grip.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A conduit reamer for a cutting tool, the conduit reamer comprising:
   a body having a longitudinal axis;
   a first blade coupled to the body and defining a first height of the conduit reamer with respect to the longitudinal axis;
   a second blade coupled to the body and defining a second height of the conduit reamer with respect to the longitudinal axis, wherein the first height is different than the second height;
   a shank end configured to be received and driven by the cutting tool;
   a bit end opposite the shank end and having an axially-extending cavity configured to receive a tool bit;
   a radially-extending aperture in the bit end in communication with the cavity;
   a locking member at least partially received in the radially-extending aperture; and
   a sleeve surrounding at least a portion of the bit end, the sleeve including a cylindrical interior surface and a recess in the cylindrical interior surface,
   wherein the sleeve is movable between an unlocked position, in which at least a portion of the locking member is received in the recess, and a locked position, in which no portion of the locking member is received in the recess.

2. The conduit reamer of claim 1, wherein the body comprises a first cylindrical portion having a first diameter and a second cylindrical portion having a second diameter.

3. The conduit reamer of claim 2, wherein the first diameter is different than the second diameter.

4. The conduit reamer of claim 2, wherein the first blade is positioned adjacent the first cylindrical portion and the second blade is positioned adjacent the second cylindrical portion.

5. The conduit reamer of claim 1, wherein the tool bit is removable from the cavity when the sleeve is in the unlocked position, and wherein the tool bit is secured in the cavity when the sleeve is in the locked position.

6. The conduit reamer of claim 5, wherein the locking member is engageable with the tool bit to secure the tool bit in the cavity when the sleeve is in the locked position.

7. The conduit reamer of claim 1, wherein at least one of the first blade and the second blade is selectively removable from the body.

8. The conduit reamer of claim 7, wherein at least one of the first blade and the second blade is retained by a hex screw.

9. The conduit reamer of claim 1, wherein at least one of the first blade and the second blade is integrally formed with the body.

10. The conduit reamer of claim 2, wherein the body further comprises a third cylindrical portion having a third diameter, wherein the third diameter is different than both the first diameter and the second diameter.

11. The conduit reamer of claim 10, further comprising a third blade coupled to the body, wherein the third blade has a third height different than both the first height and the second height.

12. The conduit reamer of claim 10, wherein the blade further comprises a third blade positioned adjacent the third cylindrical portion.

13. The conduit reamer of claim 11, wherein the first blade, the second blade, and the third blade are integrally formed with the body.

14. The conduit reamer of claim 11, wherein the first blade, the second blade, and the third blade are integrally formed with each other.

15. The conduit reamer of claim 1, wherein the first blade and the second blade are integrally formed with the body.

16. The conduit reamer of claim 1, wherein the first blade and the second blade are integrally formed with each other.

17. The conduit reamer of claim 1, wherein the locking member is engaged with the cylindrical interior surface of the sleeve when the sleeve is in the locked position.

18. The conduit reamer of claim 1, further comprising a biasing member positioned between the sleeve and the body and operable to bias the sleeve toward the locked position.

19. The conduit reamer of claim 1, wherein a first portion of the locking member protrudes into the cavity when the sleeve is in the unlocked position, wherein a second portion of the locking member protrudes into the cavity when the sleeve is in the locked position, and wherein the second portion is larger than the first portion.

20. The conduit reamer of claim 1, wherein the locking member is configured as a ball bearing.

* * * * *